United States Patent [19]

Anders et al.

[11] 4,249,879
[45] Feb. 10, 1981

[54] GRANULATING APPARATUS

[75] Inventors: Dietmar Anders; Jurgen Voigt, both of Hanover, Fed. Rep. of Germany

[73] Assignee: Hermann Berstorff Maschinenbau GmbH, Hanover Kleefeld, Fed. Rep. of Germany

[21] Appl. No.: 48,175

[22] Filed: Jun. 12, 1979

[30] Foreign Application Priority Data

Jun. 12, 1978 [DE] Fed. Rep. of Germany ....... 2825639

[51] Int. Cl.³ ............................................. A01J 21/02
[52] U.S. Cl. .................................... 425/311; 214/142; 425/313
[58] Field of Search ............... 425/307, 308, 311, 313; 264/142

[56] References Cited

U.S. PATENT DOCUMENTS

| 3,230,582 | 1/1966 | Hoffman et al. | 425/311 |
| 3,287,764 | 11/1966 | Swickard et al. | 425/311 |
| 3,308,507 | 3/1967 | Black | 425/311 |
| 3,317,957 | 5/1967 | Heston et al. | 425/311 |
| 4,021,176 | 5/1977 | Pettmer et al. | 425/307 |

FOREIGN PATENT DOCUMENTS 1959507 6/1971 Fed. Rep. of Germany ........... 425/313

Primary Examiner—Jay H. Woo
Attorney, Agent, or Firm—Schwartz, Jeffery, Schwaab, Mack, Blumenthal & Koch

[57] ABSTRACT

Granulating apparatus having a cutting plate and a multi-blade cutting tool drivable by drive means and cooperating with the cutting plate, wherein, to ensure that the operating conditions, particularly fluctuating temperatures of the various components causing differential expansion, do not affect the setting of the cutter blades with respect to the cutting plate, the cutting plate, the bearing housing, the fixed bearing, the cutting blade shaft, the blade holder and the cutting blades are mechanically interconnected with one another with such interconnection disposed approximately in the cutting plane defined between the cutting plate and the cutting blades, whereby axial force-locking and form-locking connection of the components starting from the cutting plate and extending by way of the bearing means to the cutting blades, extends approximately in the cutting plane.

11 Claims, 5 Drawing Figures

GRANULATING APPARATUS

The invention relates to apparatus for granulating plastics melts and other materials.

Apparatus has been proposed for this purpose comprising a granulating head having a cutting plate and a multi-bladed cutting tool which cooperates with the cutting plate, a housing which encloses the granulating head having cooling and conveyor means for the granulates which are cut up, and the granulating head having a guide sleeve, a bearing housing and a fixed bearing for a shaft which mounts the cutting tool.

U.S. Pat. No. 3,317,957 discloses granulating apparatus which makes provision for adjustment of the distance between the cutting blades and the cutting plate. The cutting blades can be displaced generally horizontally but it is not possible to compensate for different degrees of thermal expansion of the cutting plate, the cutting blade shaft and the bearing housing, which occur due to cooling water or the hot flow of synthetic material being fed to the apparatus at one end, causing unequal distances between the cutting blades and the cutting plate.

The invention has among its objects to maintain constant the distance once set between the rotating cutting blades and the cutting plate, irrespective of different operating conditions such as fluctuating housing temperatures, the quantity and the temperature of the synthetic material throughput and the temperature of the cooling water.

The invention further has among its objects to provide for good and precise cutting of the extruded synthetic material which issues from the cutting plate, without the polymer which is in part highly fluid being smeared on the cutting plate or forming slubs, and also of obtaining an increase in the life of the cutting blades and the cutting plate.

According to the invention there is provided apparatus for granulating plastics melts and other materials, comprising a granulating head having a cutting plate, a multi-bladed cutting rool drivable by drive means and cooperating with the cutting plate, a housing which encloses the granulating head, cooling and conveyor means for granulates which are cut up, and a guide sleeve, a bearing housing and a fixed bearing for a cutting blade shaft, the cutting plate, the guide sleeve, the bearing housing, the fixed bearing, the cutting blade shaft, a blade holder and the cutting blades being mechanically interconnected with one another with such interconnection disposed approximately in the cutting plane, which cutting plane is located between the cutting plate and the cutting blades, whereby axial force-locking and form-locking connection of the pertinent components of the apparatus, starting from the cutting plate and extending by way of the bearing means to the cutting blades, extends approximately in the cutting plane.

By virtue of the arrangement that the mechanical connection of the components with each other is disposed approximately in the cutting plane or all components which are arranged in the axial force-locking and form-locking connection of the cutting blades by way of the blade shaft and the bearing means are disposed approximately in the cutting plane or are arranged at most at the distance of a cutting surface radius out of the cutting plane, temperature-induced expansion of such components, starting from the cutting plane, is compensated. The force-locking and form-locking connection of the components lies approximately in the cutting plane between the cutting blades and the cutting plate, so that, starting from the critical point, namely the cutting plane, all components have a fixed point in that plane. This arrangement can provide therefore that, once the distance between the cutting blades and the cutting plate has been set, that distance remains unchanged, even when the individual components are subject to different thermal expansion phenomena, because the expansion which occurs is effective in directions away from the cutting plane, and therefore does not give rise to difficulties. The cutting surface radius is the radius which is from the centre point of the blade shaft to the outer edge of the cutting surface, that is to say, the surface which is swept by the cutting blades on the cutting plate.

Desirably, the bearing housing for receiving the blade shaft is arranged to be temperature-controlled, for example by cold air being blown into a space which is around the housing or by the housing being provided with bores therein which provide for a cooling water circulation. This measure provides that the temperature of the heated components, which can be up to 300° C., is not transmitted to the bearing and the blade shaft.

So that, once the distance between the cutting blades and the perforated plate has been set, that distance can be maintained during operation of the granulator, blowing cooling air into the cylindrical space between the bearing housing for mounting the blade shaft and the insulating layer which is arranged on the guide sleeve causes the housing itself and thus the entire bearing means to be kept at ambient temperature so that, irrespective of whether melt is or is not flowing through the granulator, the blade shaft and the bearing housing can be maintained at a uniform temperature and expansion phenomena so that a constant distance between the blades and the cutting plate is maintained.

If desired, to reduce production costs, the axial fixed bearing for the blade shaft can be displaced to the drive side, that is to say, taken out of the cutting plane. In this embodiment, the end, which is towards the cutting blades, of the cylindrical outer sleeve and the cylindrical guide sleeve is screwed to the cutting plate and a centering ring and arranged approximately in the cutting plane. The force-locking connection or form-locking connection in this embodiment therefore extends from the cutting plate to the guide sleeve by way of the centering ring to the bearing housing, by way of the fixed bearing which is arranged above, to the blade shaft, and from there down again to the blade holders and finally to the cutting blades.

In this embodiment, temperature control of the bearing housing and thus of the blade shaft is necessary in order not to suffer from different expansion phenomena in respect of these components, when the operating of the granulator can be achieved by the reduction in the length of the adjustment sleeve.

Screwing the cutting plate to the outer sleeve and the guide sleeve ensures that, irrespective of possibly different housing temperatures, the cutting plate represents the fixed point and the guide sleeve can expand upwardly, where it is sealed off by sealing glands.

At the drive end, a holding plate is screwed to the guide sleeve by means of cylindrical screws, while spring members, for example plate springs, are arranged between the heads of the screws and the holding plate.

Free expansion of the guide sleeve upwardly is compensated by the resilient screwing action.

The invention is diagrammatically illustrated by way of example in the accompanying drawings, in which.

Figure 1:
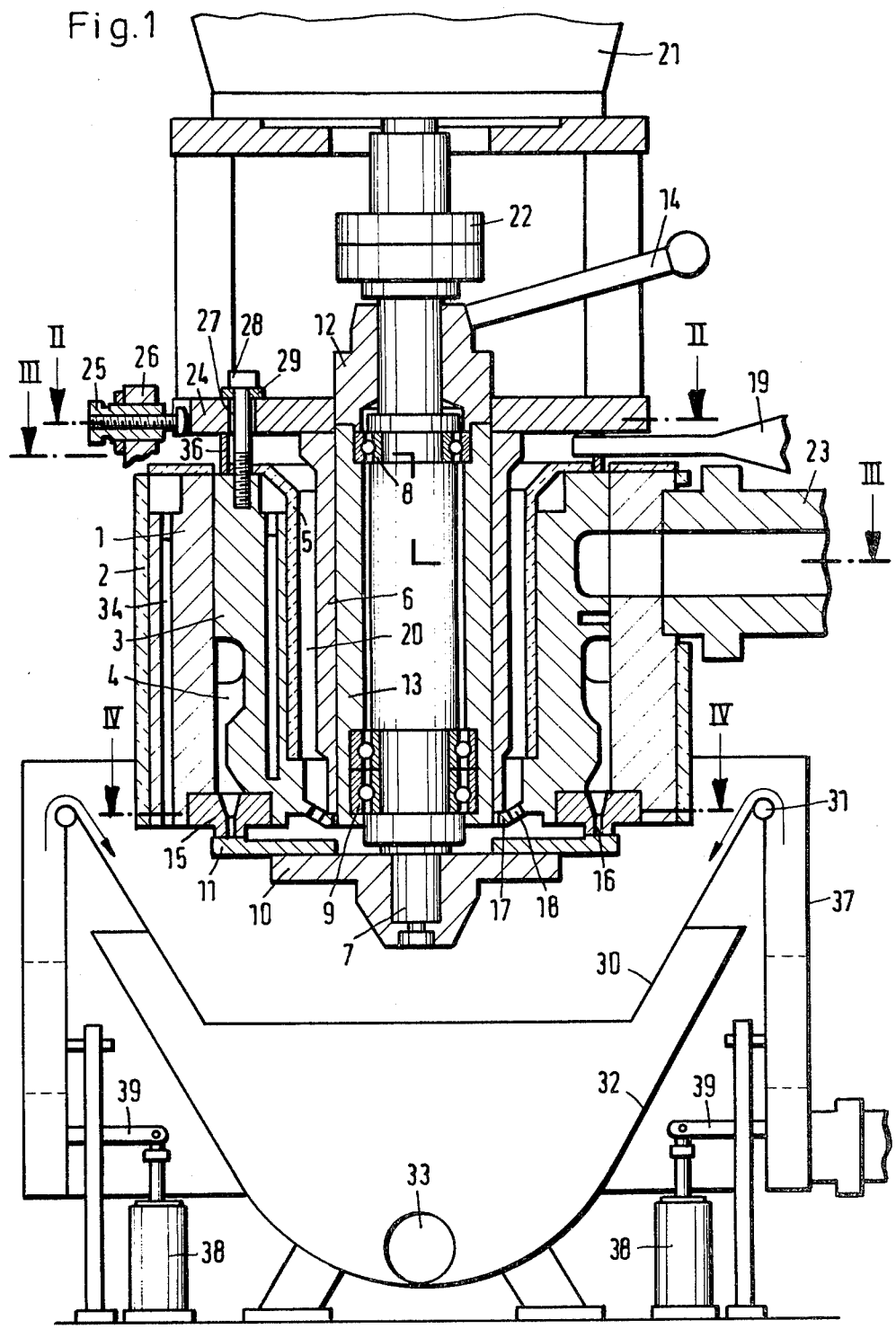
FIG. 1 shows a view in longitudinal section through a first embodiment of granulating apparatus according to the invention.
Figure 2:
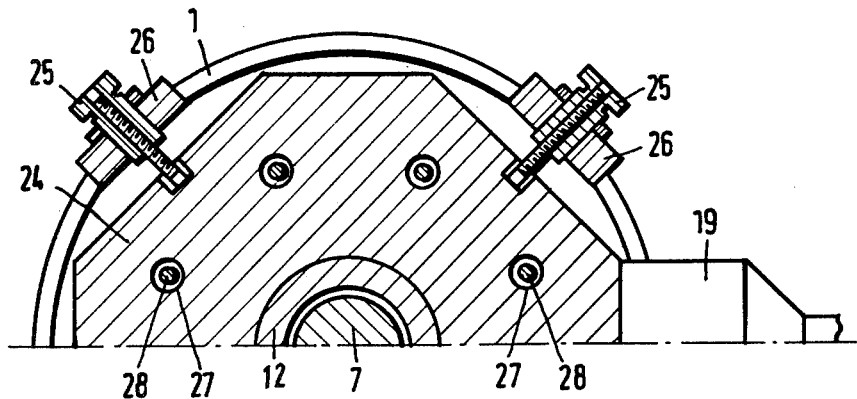
FIG. 2 shows a view in cross-section taken on line II—II of FIG. 1.
Figure 3:
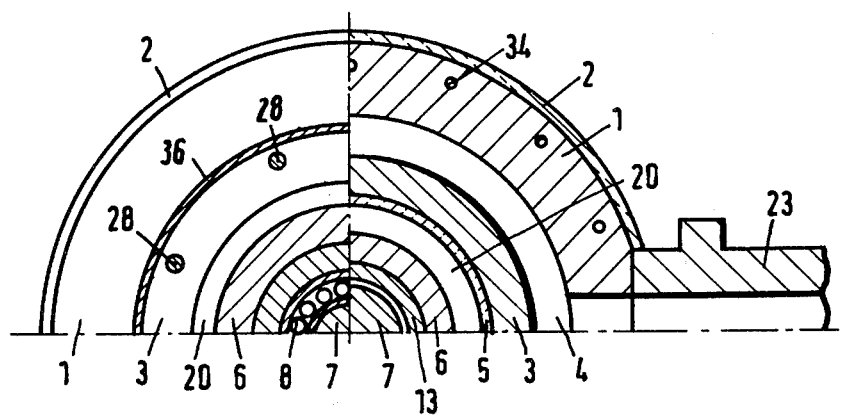
FIG. 3 shows a view in cross-section taken on line III—III of FIG. 1.

Referring to the drawings and firstly to FIGS. 1 to 4, granulating apparatus has an outer sleeve 1 with an insulating layer 2 disposed around the outer sleeve 1. Material feed passages 4 extend in the peripheral direction in the guide sleeve 3 and the guide sleeve 3 is clad with an insulating layer 5. A blade shaft 7 which is mounted by a bearing 8 and a fixed bearing 9 is disposed in a bearing housing 6. Blade holders 10 with blades 11 secured thereto are disposed at the bottom end of the blade shaft.

Means for axial adjustment of the blade shaft 7 is disposed at the top end of the blade shaft 7 and comprise an adjustment spindle 12 and an adjustment sleeve 13 fixedly screwed thereto. Axial vertical adjustment is provided by a screw thread between the bearing housing 6 and the adjustment spindle 12. The adjustment spindle 12 can be rotated by means of a lever 14 and therefore provides for adjustment of the distance between the cutting blades 11 and the cutting plate 15, as the fixed bearing 9 for the blade shaft 7 is disposed in the adjustment sleeve 13.

Disposed at the bottom end of the granulator is the cutting plate 15 with bores 16 therein for ejection or extrusion of the material to be granulated. The cutting plate 15 is connected to the outer sleeve 1 by means of screws 15a (FIG. 4) and to the guide sleeve 3 by screws 15b. A centering ring 17 is formed on the guide sleeve 3 (that is to say, the guide sleeve 3 and the centering ring 17 are in one piece or secured together by screws 17a), the bearing housing 6 lying on the centering ring 17. Provided in the centering ring 17 are bores 18 which are directed towards the blades 11.

In the embodiment shown in FIG. 1, cooling air is blown into a cylindrical space 20 between the housing 6 and the insulating layer 5 through a plurality of connections 19 which are distributed around the periphery of the apparatus. At the end of the space 20 which is towards the centering ring 17, the cooling air is blown through bores 18 towards the cutting blades 11. Upwardly, the space 20 is closed off by an annular wall 36 through which the connections 19 extend.

The blade shaft 7 can be rotated by a motor 21 with an interposed coupling means 22 which compensates for vertical displacement of the blade shaft. The rotational movement of the shaft 7, produced by the motor 21, is transmitted to the blades 11 by way of the blade holders 10.

The synthetic material melt to be granulated enters the granulating apparatus through an adaptor 23 to which an extruder is connected, and passes into the material feed passages 4 and from there through the bores 16 in the cutting plate 15.

So that plane parallelism between the cutting blades 11 and the cutting plate 15 can be adjusted, the following components of the granulator are combined to form a unit and as such are jointly pivotal:

the blade shaft 7 with the blade holders 10 secured thereto and the cutting blades 11, the upper and lower bearings 8 and 9 for the shaft 7, the bearing housing 6, an upper holding plate 24 which is secured to the bearing housing 6, the coupling means 22 which joins the blade shaft 7 to the drive motor 21 and the adjustment spindle 12 with the adjustment sleeve 13, and the drive means 21.

The above-listed components of the granulating apparatus, which are combined to form a unit, are supported on the centering ring 17 by means of the bearing housing 6 and are made pivotal and adjustable to a limited extent about the centering ring 17. Adjustability is provided by the arrangement of a plurality of differential screw drive means 25 (FIG. 2) which are distributed around the periphery and which are connected to the outer sleeve 1 by mounting means 26.

In order to provide for horizontal pivotability, apertures 27 are provided in the holding plate 24, for receiving cylindrical screws 28 the shanks of which are of smaller diameter, thereby permitting horizontal displacement of the holding plate 24 to a limited extent. Plate springs 29 are disposed between the heads of the cylindrical screws 28 which are screwed into the guide sleeve 3, and the holding plate 24, to compensate for expansion of the guide sleeve 3 in an upward direction.

As the apertures 27 are larger than the diameter of the cylindrical shanks of the screws 28, there is the possibility of adjustment movement of the components of the apparatus which are combined to form a unit.

Due to the centrifugal force of the cutting blades, the granulates which are cut up by the blades experience a radial motion and impinge on a surface 30 which is covered with a film of water which flows over an upper edge 31. The film of water transports the granulates downwardly into a granulating chamber 32 from which the granulate material can issue through an opening 33. A heating cartridge 34 is provided in the outer sleeve 1.

In order to be able to allow access to the blades and in particular to facilitate detecting differences in respect to the plane parallelism between the blades 11 and the cutting plate 15, an outer casing 37 together with the inclined surface 30 is mounted to be movable vertically by means of hydraulic cylinder units 38 and linkage assemblies 39. When the outer casing 37 is moved downwardly, the cutting blades 11 and the cutting plate 15 are freely accessible.

The following precautions are taken, for the purposes of maintaining the condition of plane parallelism once set.

As shown in FIG. 1, the cutting plate 15 is connected on the one hand to the outer sleeve 1 by the screws 15a (FIG. 4) and on the other hand to the guide sleeve 3 by the screws 15b, with the centering ring 17 being formed on the guide sleeve 3, that is to say, the centering ring 17 and the guide sleeve 3 are made from one piece. The force-locking and form-locking connection is continued through the mounting of the housing 6 on the centering ring 17 by means of a centering seat. The fixed bearing 9 is fitted into the blade shaft 7 whereby a force-locking or positive connection is in turn made by way of the blade holders 10, to the cutting blades 11.

As the illustrated form-locking and force-locking connection between the above-mentioned components is disposed approximately in the cutting plane, this ensures that any different temperatures and thus expansion in respect of the material of the components cannot affect the distance, once set, between the cutting blades and the cutting plate.

Useful results are also achieved if some components, for example the fixed bearing 9, are disposed up to a maximum of the distance of a cutting surface radius from the cutting plane, but these results, that is to say, keeping the distance between the cutting plate 15 and the cutting blades 11 constant, differ markedly from the ideal case, namely disposing the above-mentioned components approximately in or in the direct vicinity of the cutting plane, as shown in FIG. 1.

Disposing for example the fixed bearing 9 beyond the distance of a cutting surface radius from the cutting plane no longer provided for satisfactory constant distances between the cutting plate 15 and the cutting blades 11, unless use was also made of an additional means, for example temperature-control means for controlling the temperature of the bearing housing 6 and the blade shaft 7.

Figure 4:
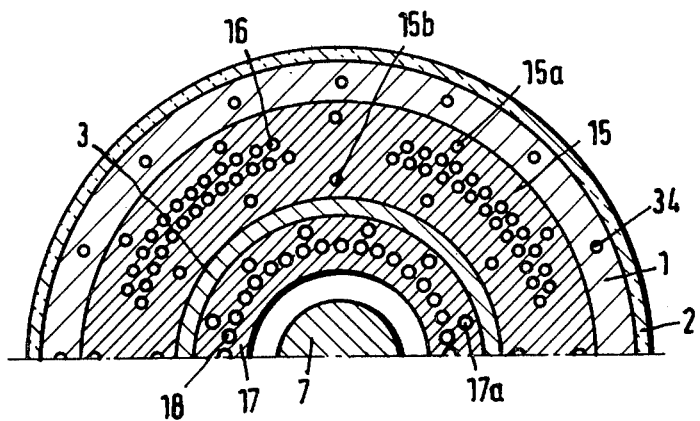
FIG. 4 shows a view in cross-section taken on line IV—IV of FIG. 1.
Figure 5:
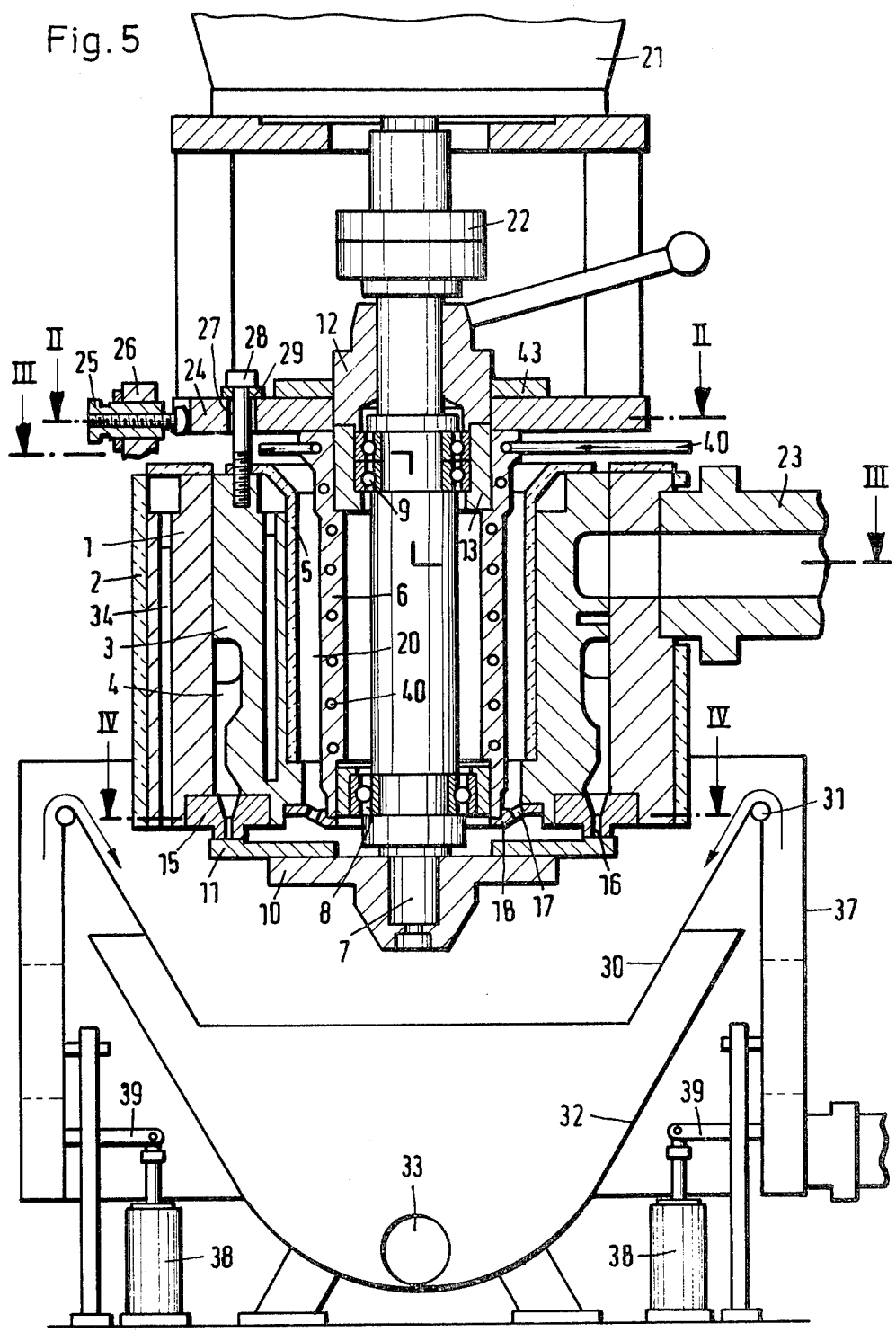
FIG. 5 shows a view in longitudinal section through a further embodiment of granulating apparatus according to the invention similar to the embodiment of FIG. 1, but with water cooling for a bearing housing.

An embodiment of this kind is shown in FIG. 5, in which like components to those described with reference to FIG. 4 are given like reference numerals. In this embodiment, the fixed bearing 9 has been shifted upwardly, that is to say, towards the drive end. The force-locking and form-locking connection is thus effected by way of the following components: the cutting plate 15, the guide sleeve 3, the centering ring 17, the bearing housing 6, the holding plate 24, the adjustment spindle 12, the adjustment sleeve 13, the fixed bearing 9, the blade shaft 7, the blade holders 10 and the cutting blades 11. Except for the components holding the plate 24, the adjustment spindle 12, the adjustment sleeve 13 and the fixed bearing 9, all the components in this embodiment are also disposed approximately in the cutting plane.

The operating efficiency of such granulating apparatus can be enhanced by passing cooling air around the bearing housing or by cooling the bearing housing by a circulation of cooling water, supplied through bores 40, preferably helical bores.

The axial displacement of the shaft 7 is effected, in the FIG. 5 embodiment, by actuation of the lever 14 which is mounted on the adjustment spindle 12. The adjustment spindle 12 is fixedly connected to the adjustment sleeve 13. Rotation of the adjustment spindle 12 which engages with a screw thread into the holding plate 24 causes axial displacement of the shaft 7 because the bearing 9 in the embodiment of FIG. 5 is the fixed bearing and entrains the shaft 7. A check ring 43 is provided above the holding plate 24.

Axial differences in length which occur due to fluctuations in temperature, between the bearing housing 6 and the blade shaft 7, are prevented by the temperature control of the bearing housing 6 as this temperature control action ensures that the bearing housing and the blade shaft are at a constant and uniform temperature.

What is claimed is:

1. Apparatus for granulating plastics melt and other materials comprising a granulating head; a cutting plate mounted on said granulating head; a cutting tool having a plurality of blades spaced a predetermined distance from and cooperating with said cutting plate and defining therewith a cutting plane; a shaft to which said blade holder is mounted for rotation, and drive means for rotating said shaft; a housing enclosing said granulating head, and means in said housing for cooling and conveying cut granules; a guide sleeve to which said cutting plate is secured; a bearing housing around said shaft and within said guide sleeve, and a fixed bearing around and supporting said shaft; a centering ring disposed approximately in said cutting plane and supporting said bearing housing, the arrangement being such that said cutting plate, said blade holder and said cutting blades, and said retaining ring are approximately in said cutting plane, whereby expansion of the material of said components due to the heat of the melt is compensated for so that the predetermined distance between said blades and said cutting plate can be continuously maintained.

2. The apparatus of claim 1 further including means for permitting limited upward temperature-induced expansion of said bearing housing.

3. The apparatus of claim 2 further including, adjacent said drive means, a holding plate screwed to the adjacent end of said guide sleeve by means of cylindrical screws, and wherein said means for permitting expansion comprises spring members disposed between the heads of said screws and said holding plate.

4. The apparatus of claim 1 further including a cylindrical space provided between said bearing housing and an insulating layer which is disposed on said guide sleeve, means for supplying cooling air to said space at the end thereof which is towards said drive means, and openings in said centering ring for the discharge of cooling air towards said cutting blades.

5. The apparatus of claim 1 wherein said shaft is operatively connected to said bearing housing for vertical movement therewith, and further including means for vertically adjusting said bearing housing and thus said shaft so as to predeterminedly position said blades relative to said cutting plate.

6. The apparatus of claim 5 wherein said means for vertical adjustment include an adjustment sleeve disposed around said shaft, the outer surface of said adjustment sleeve threadedly engaging the interior threaded surface of said bearing housing, and spindle means operatively connected to said adjustment sleeve for rotatably adjusting the same.

7. The apparatus of claim 5 wherein said means for vertically adjusting said bearing housing includes a spindle the outer periphery of which is threadedly engaged with a threaded opening in a plate positioned above said guide sleeve and said bearing housing, and an adjustment sleeve positioned between said bearing housing and said spindle, said adjustment sleeve operatively engaging said bearing housing.

8. The apparatus of claim 6 wherein said fixed bearing is positioned in recesses provided therefor in said adjustment sleeve and said shaft, adjacent the bottoms of these members.

9. The apparatus of claim 1 wherein said fixed bearing is positioned away from said cutting plane toward said drive means, said fixed bearing being positioned in recesses provided therefor in said shaft and in an adjustment sleeve positioned within said bearing housing.

10. The apparatus of claim 9 further including means for cooling said bearing housing, said means including bores formed in said bearing housing, and means for supplying a cooling liquid to said bores.

11. The apparatus of claim 1 wherein said granulating head includes a cylindrical outer sleeve disposed around said guide sleeve, said cutting plate being rigidly secured both to said outer sleeve and said guide sleeve, said centering ring being secured to and extending radially inwardly from said guide sleeve to support said bearing housing, and temperature control means for said bearing housing and said shaft.

* * * * *